(12) United States Patent
Frisch

(10) Patent No.: US 6,827,367 B1
(45) Date of Patent: Dec. 7, 2004

(54) FASTENER FOR SECURING A GAS BAG MODULE TO A STEERING WHEEL

(75) Inventor: Ralph Frisch, Mömbris (DE)

(73) Assignee: TRW Automoitve Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/676,237

(22) Filed: Sep. 29, 2000

(30) Foreign Application Priority Data

Nov. 15, 1999 (DE) .................................. 299 20 025 U

(51) Int. Cl.⁷ .............................................. B60R 21/16
(52) U.S. Cl. .................................................. 280/728.2
(58) Field of Search .......................... 280/728.2, 728.1, 280/731, 743.1; 24/662, 587

(56) References Cited

U.S. PATENT DOCUMENTS

| | | | | |
|---|---|---|---|---|
| 2,252,286 A | * | 8/1941 | Hathorn ...................... 411/349 |
| 5,333,897 A | * | 8/1994 | Landis et al. ............ 280/728.1 |
| 5,350,190 A | * | 9/1994 | Szigethy .................. 280/728.1 |
| 5,520,410 A | * | 5/1996 | Sun .......................... 280/728.3 |
| 5,651,562 A | * | 7/1997 | Hagen et al. ............ 280/728.3 |
| 5,735,626 A | | 4/1998 | Khatiblou et al. |
| 5,803,484 A | * | 9/1998 | Orme ....................... 280/728.2 |
| 5,810,535 A | * | 9/1998 | Fleckenstein et al. ........ 411/522 |
| 5,833,263 A | | 11/1998 | Wittmann et al. |
| 5,878,468 A | * | 3/1999 | Tomic et al. ................. 24/576 |
| 6,056,313 A | | 5/2000 | Lutz et al. |
| 6,094,785 A | * | 8/2000 | Montgomery et al. ......... 24/324 |
| 6,138,329 A | * | 10/2000 | Johnson ....................... 24/587 |

FOREIGN PATENT DOCUMENTS

| | | |
|---|---|---|
| DE | 2029275 | 12/1970 |
| DE | 4134201 C1 | 11/1992 |
| DE | 19607342 | 8/1997 |
| DE | 19607342 A1 | 8/1997 |
| DE | 29706246 | 9/1997 |
| DE | 29706246 U1 | 9/1997 |
| EP | 0919734 A1 | 6/1999 |
| FR | 2616474 | 12/1988 |
| GB | 1307584 | 2/1973 |
| JP | 6-249215 | 9/1994 |

* cited by examiner

*Primary Examiner*—Faye M. Fleming
(74) *Attorney, Agent, or Firm*—Tarolli, Sundheim, Covell & Tummino L.L.P.

(57) ABSTRACT

A fastener for securing a gas bag module to a steering wheel includes two fastening arms and a fastener part. The fastening arms enter into a snap-action connection with the fastener part and clasp the fastener part in a connected condition.

2 Claims, 1 Drawing Sheet

FASTENER FOR SECURING A GAS BAG MODULE TO A STEERING WHEEL

TECHNICAL FIELD

The invention relates to a fastener, in particular for securing a gas bag module to a steering wheel, the fastener comprising two fastening arms and a fastener part.

BACKGROUND OF THE INVENTION

Securing the gas bag module, containing the drivers air bag, to a steering wheel needs to satisfy various requirements. For one thing it needs to be rugged enough so that it will under no circumstances become loose during deployment of the gas bag in a restraint situation, but for another, it needs to be releasable for any repair or replacement of the gas bag module needed. Apart from this the time it takes in installing the gas bag module should be a minimum. These requirements can be satisfied by snap-action fasteners in which flexible arms engage protuberances provided on a companion piece. The disadvantage with known snap-action fasteners is that they can only be released with difficulty, or, if easily releasable are not rugged enough.

The object of the invention is to propose a fastener ensuring a safe but readily releasable connection of two components, more particularly of a gas bag module and a steering wheel.

BRIEF SUMMARY OF THE INVENTION

This is achieved in a fastener which comprises two fastening arms and a fastener part. The fastening arms enter into a snap-action connection with the fastener part and clasp the fastener part in a connected condition. Due to the double-sided engagement a firm connection materializes between the fastening arms and the fastener part. The connection is easily released by pressing apart the arms with a suitable tool, it being of advantage that releasing the connection is no-destructive. Since the fastening arms are pretensioned inwards the risk of the arms being damaged is reduced.

In one preferred embodiment of the invention the fastening arms are provided with hooks having contact surface areas and the fastener part comprises a concave contacting surface area into which the contact surface areas of the hooks engage in the connected condition. This design improves retainment of the hooks on the fastener part. In addition to this the concave contacting surface area of the fastener part serves to guide the contact surface areas of the hooks during release of the connection.

In another preferred embodiment the fastener part and the fastening arms comprise ramps corresponding to each other. These ramps form guides which reduce the loading of the fastening arms on spreading and prevent damage to the snap-action hooks in producing the connection.

Preferably the ramps are configured on the fastener part such that they form an angle and that the fastening arms slide back towards the apex of the angle should the connection fail to be made. This configuration ensures that a component provided with fastening arms, more particularly a gas bag module which to produce the connection is inserted into a component containing the fastener part, more particularly a steering wheel, is urged back should the snap-action connection fail to latch, thus making it easy to recognize faulty assembly. This movement may be supported by a spring.

Advantageously an assembly comprising a steering wheel and a gas bag module is provided, the fastening arms being connected to the gas bag module and the fastener part to the steering wheel in order to improve access to the fastener. Preferably in this arrangement the fastening arms are configured integrally with the gas bag module, e.g. in the region of the inflator mount or generally a module supporting structure, and the fastener part is configured integrally with the steering wheel, e.g. with its supporting structure. In this way there is achieved a rugged configuration whilst simultaneously reducing the number of components required since the fastener part and the fastening arms, respectively, do not need to be produced as separate elements.

BRIEF DESCRIPTION OF THE DRAWING

The sole Figure shows a section through a fastener in accordance with the invention.

DETAILED DESCRIPTION OF THE PREFERRED EMBODIMENT

Figure 1:
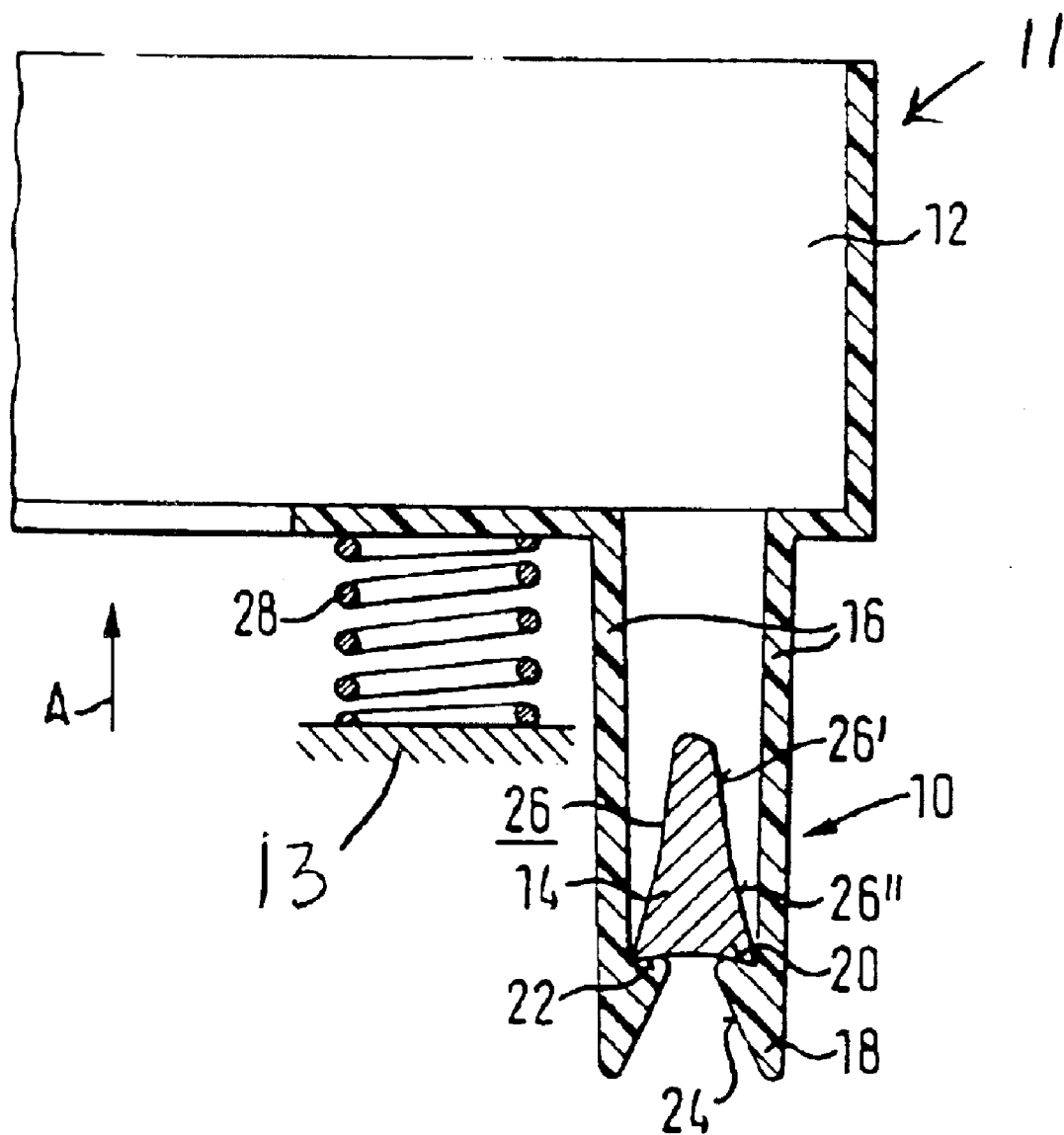

Referring now to FIG. 1, there is illustrated a fastener 10 in accordance with the invention which connects a component, e.g., the inflator mount 12 of a gas bag module 11 to a fastener part 14 secured, e.g., to a steering wheel 13 by a snap-action connection. The fastener 10 comprises two fastening arms 16 preferably made of a plastics material which end in hooks 18. In the connected condition which is shown, the hooks 18 clasp the fastener part 14 in such a manner that the flat or slightly convex upper sides 20 contact a corresponding undercut, preferably concave surface area 22 on the fastener part 14. In this condition, the inflator mount 12 is locked in place against tension in the direction of the arrow A away from the steering wheel.

In addition the hooks 18 of the fastening arms 16 comprise ramps 24 at their side facing the fastener part 14. The fastener part 14 comprises corresponding ramps 26. Both the ramps 26 of the fastener part and the ramps 24 of the hooks include angles whose legs run towards each other, as seen in the direction of the arrow A. The ramps 26 of the fastener part are preferably configured with two steps 26', 26". The first step of the ramps 26' includes a smaller angle than the second step 26".

In making the connection the gas bag module is inserted contrary to the direction of the arrow A into its mount in the steering wheel and the fastening arms 16, pretensioned inwardly towards the fastener part 1t, slide by their ramps 24 along the ramps 26 and are pressed apart so gently that the edges of the hooks 18 cannot be damaged. The less inclined ramps 26' first permit soft seating and shifting with little effort, whereas in the region of the more inclined ramps 26" a sharp increase in the counterforce materializes. Once the hooks have arrived at the end of the ramps 26" the hooks snap back by the distance spread apart and clasp the fastener part 14.

When the insertion movement of the gas bag module stops before the hooks 18 snap in place in the surface area 22, the fastening arms 16 and thus the gas bag module are urged back, due to the spring force of the fastening arms 16, contrary to the direction of the arrow A and away from the steering wheel due to the shape of the ramps 26 of the fastener part—but especially due to that of the ramps 26"—and the ramps 24 of the hooks. This movement is assisted by a spring 28 disposed between the steering wheel and the gas bag module, this spring being pretensioned by the insertion movement. It is thus easy to recognize any failure of the snap-action connection to occur.

To release the connection the hooks 18 are pressed apart at their ramps 24 by a suitable tool, e.g. a screwdriver until the contact surface area 22 of the fastener part 14 releases the contact surface areas 20 of the hooks 18, the contact surface area 22 serving here as a guide for the contact surface areas 20 of the hooks. As soon as the ramps 24 of the hooks 18 are in contact with the ramps 26 of the fastener part, the gas bag module is moved due to the shape of the ramps 24, 26 and the spring force of the fastening arms 16 so far in the direction of the arrow A that the hooks 18 can no longer clasp the fastener part 14. The spring 28 pretensioned on insertion of the gas bag module into the steering wheel assists this movement and urges the gas bag module from the steering wheel.

What is claimed is:

1. Apparatus comprising:

a gas bag module including an inflator mount and two fastening arms configured integrally with said inflator mount; and a fastener part configured integrally with a steering wheel, said fastening arms entering into a snap-action connection with said fastener part and clasping said fastener part in a connected condition to connect said gas bag module and said inflator mount with the steering wheel, said fastening arms comprising hooks having contact surface areas and said fastener part comprising a contact surface area into which said contact surface areas of said hooks engage in said connected condition, said fastener part and said fastening arms comprising ramps corresponding to each other, said ramps of said fastener part including an angle and said hocks sliding back towards the apex of said angle should the connection fail to be made.

2. The apparatus according to claim 1 wherein said contact surface of the fastener part is concave.

* * * * *